United States Patent
Huang

(10) Patent No.: US 8,628,051 B2
(45) Date of Patent: Jan. 14, 2014

(54) ADUSTABLE DISPLAY MOUNTING BRACKET ASSEMBLY

(76) Inventor: Ming-Hsien Huang, New Taipei (TW)

(\*) Notice: Subject to any disclaimer, the term of this patent is extended or adjusted under 35 U.S.C. 154(b) by 266 days.

(21) Appl. No.: 13/171,424

(22) Filed: Jun. 28, 2011

(65) Prior Publication Data

US 2012/0241578 A1   Sep. 27, 2012

(30) Foreign Application Priority Data

Mar. 23, 2011   (TW) .............................. 100205179 U

(51) Int. Cl.
*E04G 3/00* (2006.01)

(52) U.S. Cl.
USPC .............. 248/286.1; 248/276.1; 248/922; 248/920; 248/921; 248/923; 361/679.02; 361/679.21

(58) Field of Classification Search
CPC .............. F16M 11/10; F16M 11/2092; F16M 11/2014; F16M 2200/061; F16M 2200/068; F16M 13/02
USPC ............. 248/276.1, 284.1, 286.1, 285.1, 917, 248/922, 920, 921, 923; 361/679.02, 361/679.21
See application file for complete search history.

(56) References Cited

U.S. PATENT DOCUMENTS

| | | | |
|---|---|---|---|
| 5,924,664 A * | 7/1999 | Mileos et al. ............ | 248/281.11 |
| 6,533,229 B1 * | 3/2003 | Hung ........................ | 248/286.1 |
| 6,905,102 B2 * | 6/2005 | Lin ............................ | 248/285.1 |
| 7,513,474 B2 * | 4/2009 | Anderson et al. .......... | 248/284.1 |
| 7,641,163 B2 * | 1/2010 | O'Keene .................... | 248/292.14 |
| 7,857,270 B2 * | 12/2010 | Short et al. ................. | 248/284.1 |
| 2004/0099779 A1 * | 5/2004 | Mileos et al. ............. | 248/281.11 |
| 2006/0291152 A1 * | 12/2006 | Bremmon ................... | 361/681 |
| 2007/0090250 A1 * | 4/2007 | O'Keene .................... | 248/299.1 |
| 2007/0176067 A1 * | 8/2007 | Monaco ..................... | 248/284.1 |
| 2007/0277351 A1 * | 12/2007 | Hung ........................... | 16/366 |
| 2008/0315049 A1 * | 12/2008 | Bailo et al. ................. | 248/176.1 |
| 2009/0194649 A1 * | 8/2009 | Huang ........................ | 248/183.3 |
| 2012/0001044 A1 * | 1/2012 | Gwag ........................ | 248/277.1 |
| 2012/0104204 A1 * | 5/2012 | Hung ......................... | 248/286.1 |
| 2013/0048811 A1 * | 2/2013 | Tseng et al. .............. | 248/220.21 |
| 2013/0048819 A1 * | 2/2013 | Hung ......................... | 248/286.1 |

FOREIGN PATENT DOCUMENTS

TW         M303314         12/2006

\* cited by examiner

*Primary Examiner* — Anita M King
(74) *Attorney, Agent, or Firm* — Li & Cai Intellectual Property (USA) Office

(57) ABSTRACT

An adjustable display mounting bracket assembly includes a mounting bracket, a linkage unit, and a fixing plate. The mounting bracket includes a main body, at least one first connecting member, at least one second connecting member, and a support body. The first and second connecting members are pivotally connected to the main body and the support body. The second connecting member can slide relative to the main body for adjusting the mounting bracket. The linkage unit is pivotally connected to the mounting bracket on one end and the fixing plate on opposite end. The linkage unit allows the distance between the mounting bracket and the fixing plate to be adjustable.

12 Claims, 19 Drawing Sheets

ADJUSTABLE DISPLAY MOUNTING BRACKET ASSEMBLY

BACKGROUND OF THE INVENTION

1. Field of the Invention

The instant disclosure relates to a display mounting bracket assembly; more particularly, to an adjustable display mounting bracket assembly.

2. Description of Related Art

Please refer to FIG. 1, which shows a conventional display bracket disclosed by the Taiwan Patent #M303314, which is entitled "Adjustable Hinge for a Display." The display bracket comprises a pair of bases 10 and a pair of adjusting assemblies 20 connected thereto, with the figure only showing one of each. Each of the adjusting assembly 20 includes a connection rod 21, an attachment rod 22, and four arms 23 (the figure only shows two of the four arms). The preceding parts are pivotally connected with each other in forming a trapezoidal four-bar linkage. Functionally, the attachment rod 22 can be inclined upward or downward at various angles. However, when not in use, the display can not be retracted by the bracket to save space. On the other hand, the position of the attachment rod 22 relative to the connection rod 21 is fixed sideways. Such configuration means the display can not shift sideways relative to the wall 30 and causes inconvenience to the users.

SUMMARY OF THE INVENTION

One aspect of the instant disclosure is to provide an adjustable display mounting bracket assembly The assembly offers space-saving advantage and sideways adjustment capability for the mounted display.

The assembly comprises a mounting bracket, at least one linkage unit, and a fixing plate. The mounting bracket has a main body, at least one first connecting member, at least one second connecting member, a support body, and at least one fastening means. The main body includes at least one first fixing portion and at least one second fixing portion. The first connecting member has a first end portion and a second end portion formed oppositely thereon. The first end portion of the first connecting member is pivotally connected to the first fixing portion of the main body for pivoting about a first axis. The second connecting member has a first end portion and a second end portion formed oppositely thereon. A sliding slot is formed on the first end portion of the second connecting member. The sliding slot has a first end defined near the second end portion of the second connecting member and a second end defined oppositely. The fastening means is projected through the sliding slot to pivotally connect the first end portion of the second connecting member with the second fixing portion of the main body. Thus, the second connecting member is pivotable around a second axis. The support body has at least one first connecting portion and at least one second connecting portion. The first connecting portion is pivotally connected to the second end portion of the first connecting member and pivotable around a third axis. The second connecting portion is pivotally connected to the second end portion of the second connecting member and pivotable around a fourth axis.

In addition, the first end portion of the second connecting member is slidable with respect to the second fixing portion. In this manner, the distance between the second and fourth axes can be adjusted.

More specifically, when the fastening means is at the first end of the sliding slot, the distance between the second and fourth axes is the shortest. When the fastening member is at the second end of the sliding slot, the distance is the longest.

The fixing plate is used for securing the assembly to a mounting surface, such as a wall. The linkage unit is pivotally connected to the fixing plate on one end and pivotally connected to the mounting bracket on opposite end. The linkage unit serves to adjust the distance between the mounting bracket and the fixing plate.

The support body has a base. A first supporting wall and a second supporting wall are formed perpendicularly on respective opposite sides of the base. The first supporting wall has at least one first shaft hole formed thereon, and the second supporting wall has at least one second shaft hole formed thereon correspondingly. The linkage unit further includes a shaft, a first connecting arm, a connecting shaft, and a second connecting arm. The two opposite ends of the shaft project through the first and second shaft holes respectively. The first connecting arm is pivotally connected to the shaft on one end and pivotally connected to the connecting shaft on opposite end. The second connecting arm is pivotally connected to the connecting shaft on one end and pivotally connected to the fixing plate on opposite end.

Furthermore, the distance between the first and second axes is denoted as A. Similarly, the distance between the first and third axes is denoted as B. The distance between the third and fourth axes is denoted as C, and the shortest distance between the second and fourth axes is denoted as D. When the fastening means is slid to the first end of the sliding slot, distance A is equal to the summation of distances B, C, and D. Conversely, when the fastening means is not at the first end of the sliding slot, distance A would be less than the sum of distances B, C, and D. Together, the main body, the first connecting member, the second connecting member, and the support body make up a rocker mechanism-like structure. The first and second connecting members each resemble a rocker arm, while the support body acts as a fixed rod.

Furthermore, the main body has a base plate and at least one side plate extending perpendicularly thereof The first and second fixing portions are formed at opposing respective ends of the side plate. The support body has a base, wherein the first and second supporting walls are formed perpendicularly on respective sides of the base oppositely. The first connecting portions are arranged perpendicularly on the respective end portions of the first supporting wall oppositely. Likewise, the second connecting portions are arranged perpendicularly on the respective end portions of the second supporting wall oppositely. When the fastening means is moved to the second end, the distance between the second and fourth axes is the greatest. At such configuration, the angle formed in between the base plate of the main body and the base of the support body can be adjusted to its greatest value.

Also, when the fastening means is at the first end, the distance between the second and fourth axes is the least. At such condition, the mounting bracket collapses as the base of the support body touches the base plate of the main body parallelly.

Preferably, the first fixing portion has a fixing hole formed thereon, and the second fixing portion has a through hole formed thereon. Each first connecting portion of the support body has a first through hole formed thereon, and each second connecting portion has a second through hole formed thereon. Furthermore, a first hole and a second hole are formed on the first end portion and the second end portion of the first connecting member, respectively. An aligning hole is formed on the second end portion of the second connecting member. By projecting the fastening means through the first through hole, the second hole, the second through hole, the aligning hole, the fixing hole, the first hole, the through hole, and the sliding slot, the following parts are pivotally connected, namely: the main body, the first connecting member, the second connecting member, and the support body.

Preferably, a blocking portion is defined on the edge portion of the first end portion of the first connecting member. A stopping portion is defined on the edge portion of the second connecting portion of the support body.

Preferably, the fastening means includes at least one first fastening member. The first fastening member has at least one locking piece, at least one first torque-adjusting washer, at least one second torque-adjusting washer, at least one lock washer, and a nut. The first fastening member is projected inwardly through a locking hole formed on the locking piece, the first torque-adjusting washer, the second torque-adjusting washer, two lock washers, and the nut.

Furthermore, the assembly may include at least one support link, and the fastening means may further include at least one second fastening member. The support link has a first end portion with a first securing hole formed thereon. The second fastening member has a threaded body projected through the second hole of the first connecting member, the first through hole of the first connecting portion of the support body, and the first securing hole of the support link.

Further still, the assembly may include at least one spacer. A second end portion is defined on the support link opposite of the first end portion. A second securing hole is formed on the second end portion. The spacer is disposed between the first end portion of the first connecting member and the second end portion of the support link. The spacer is aligned with the first hole of the first connecting member and the second securing hole of the support link. The first fastening member is projected through the locking piece, the first fixing portion of the main body, the first end portion of the first connecting member, the spacer, the second end portion of the support link, and the nut.

Also, the assembly can further include at least one sleeve, and the fastening means can further include at least one third fastening member. The third fastening member has a threaded body, which is driven through the aligning holes 1312 of the second connecting members and the second through holes of the second connecting portions. The sleeve is fitted over the third fastening member between the two second connecting portions. The opposite ends of the sleeve face the respective inner surfaces of the second connecting members adjacent to the second connecting portions.

Based on the above, by virtue of the mounting bracket assembly of the instant disclosure, the display can be mounted onto the adjustable mounting bracket, wherein the linkage unit is pivotally connected to the mounting bracket and the fixing plate on respective ends oppositely. When the connecting shaft of the linkage unit is chosen as the pivot point, the display can move toward or away from the fixing plate, or even moving diagonally with respect to the fixing plate. On the other hand, if the shaft of the linkage unit is chosen as the pivot point, the display can pivot on the linkage unit accordingly. When the mounting bracket is adjusted to the greatest extent, i.e., at the trapezoidal position, the display can be inclined upward or downward with respect to the linkage unit. Thereby, the adjustable mounting bracket assembly of the instant disclosure allows adjustment of the viewing angle of the display and its position. When not in use, the mounting bracket can be collapsed and the assembly itself can be pivoted so as to reduce the space taken up by the display/mounting bracket assembly.

DETAILED DESCRIPTION OF PREFERRED EMBODIMENTS

To further explain the characteristics and technical features of the instant disclosure, please refer to detailed descriptions below and figures. Please note that these referenced figures are only for explanation purposes, therefore they are not used to restrict the scope of the instant disclosure.

First Embodiment

Figure 1:
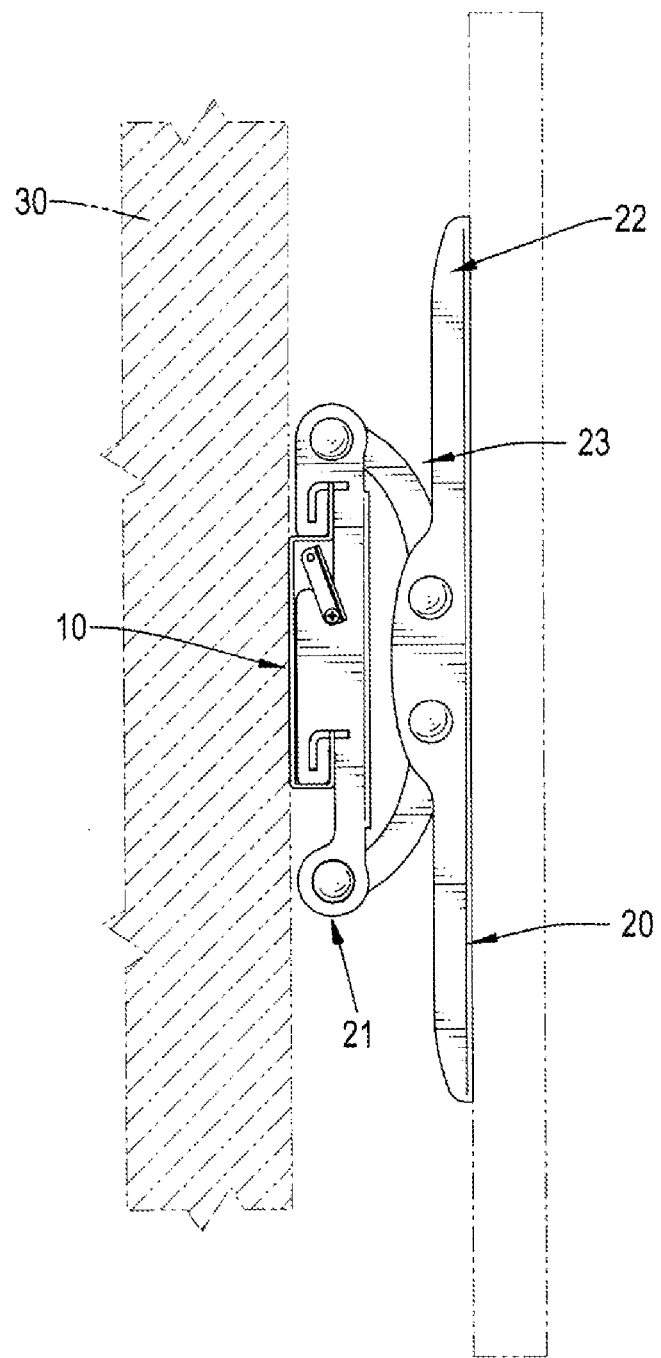
FIG. 1 is a side view of a conventional display mounting bracket.
Figure 2:
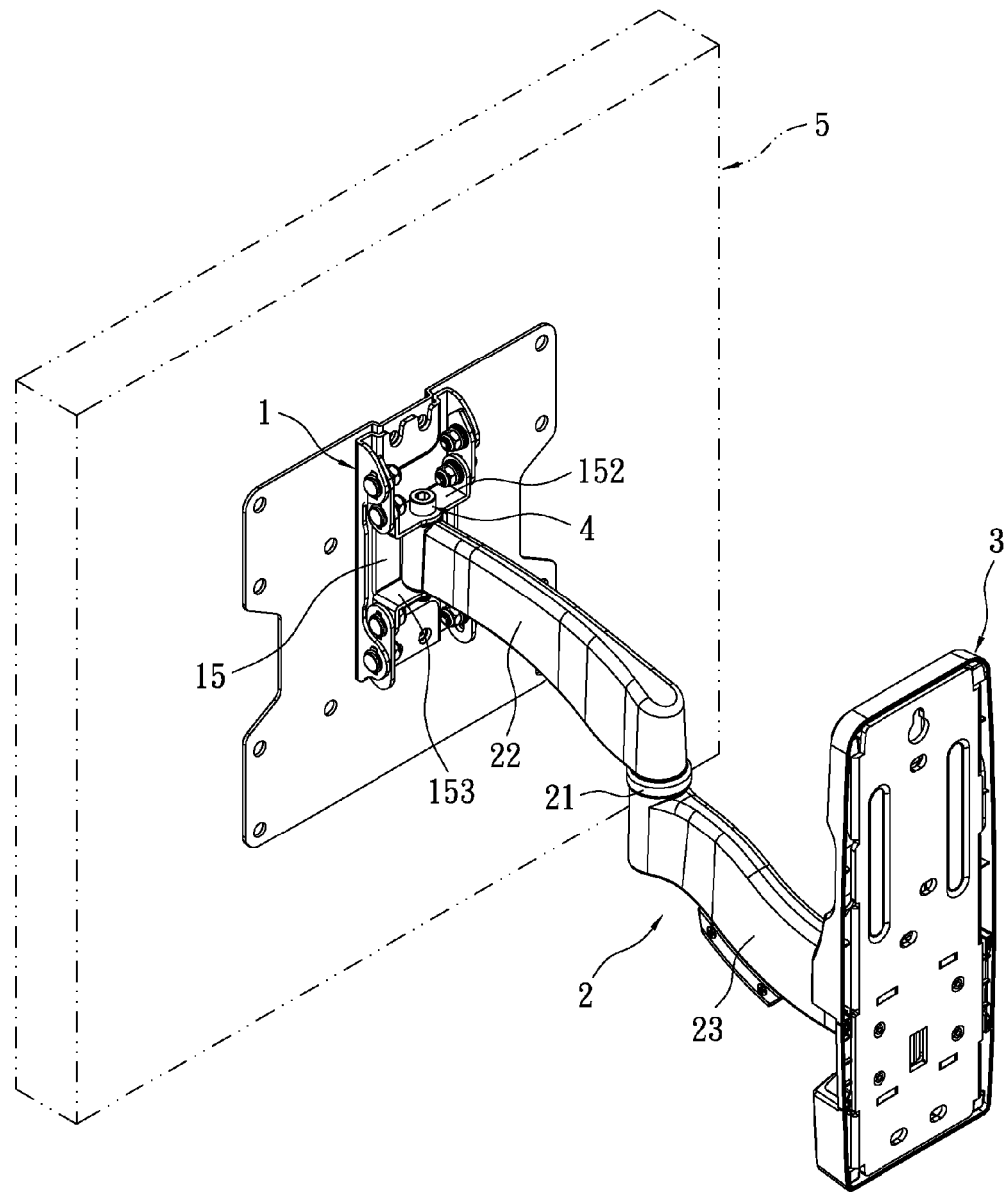
FIG. 2 is a perspective view of an adjustable display mounting bracket assembly of a first embodiment of the instant disclosure connected to a display.
Figure 3:
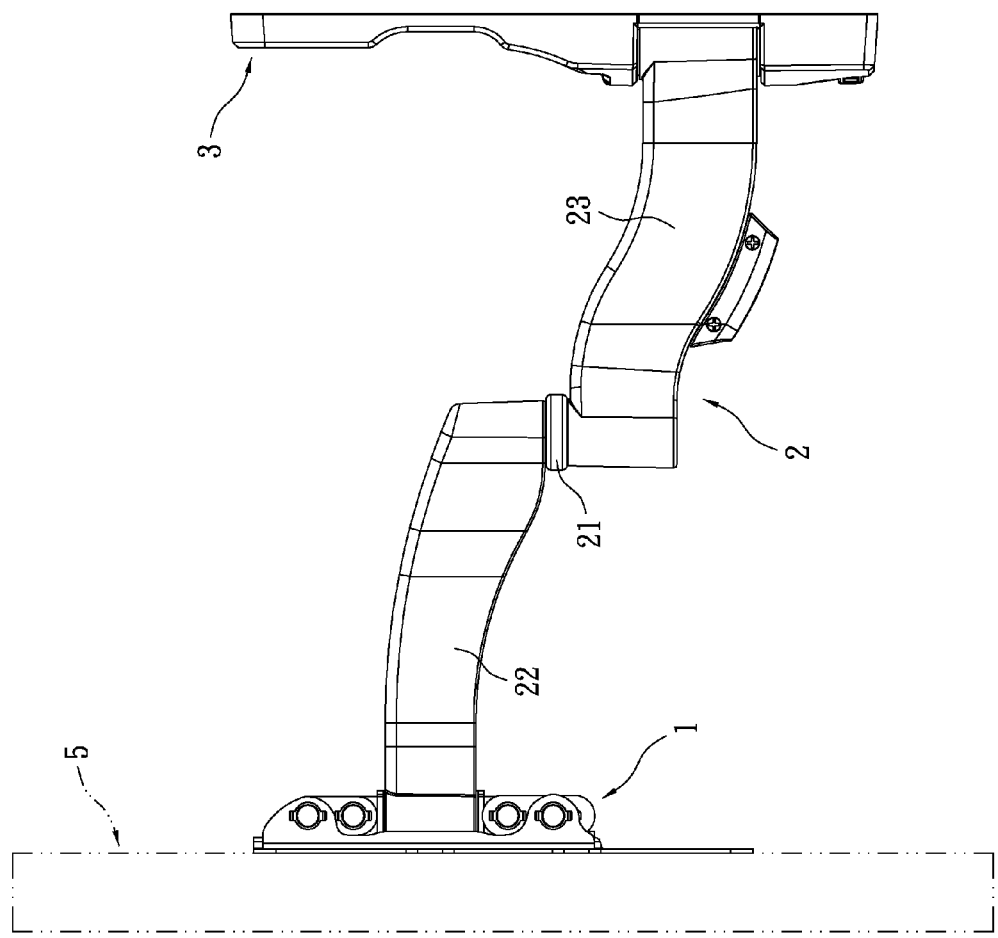
FIG. 3 is a side view of FIG. 2.
Figure 4:
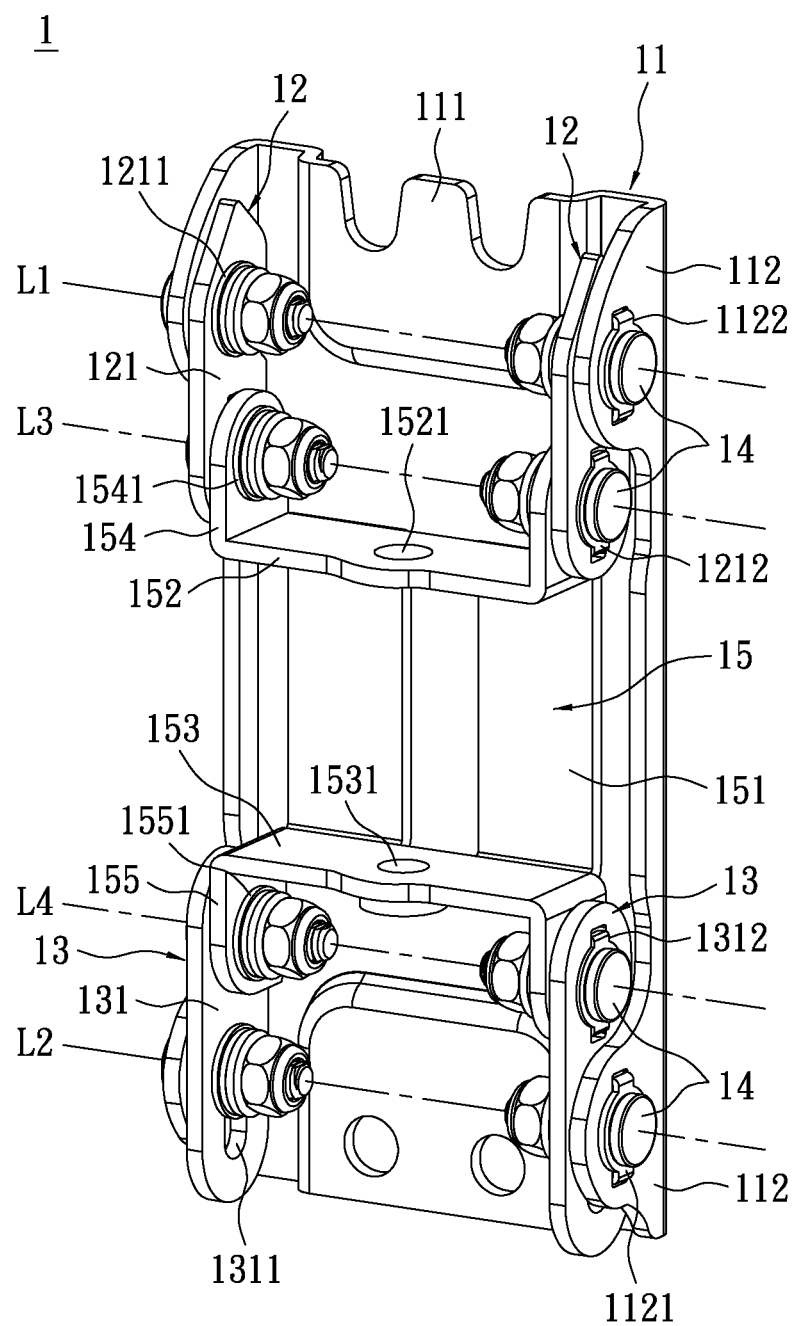
FIG. 4 is a perspective view of a mounting bracket of the adjustable display mounting bracket assembly of the first embodiment of the instant disclosure.

Please refer to FIGS. 2, 3, and 4, which show an adjustable display mounting bracket assembly of the instant disclosure. The assembly comprises: an adjustable mounting bracket 1; a fixing plate 3 (for securing to a mounting surface such as a wall); and a linkage unit 2 pivotally connected between the mounting bracket 1 and the fixing plate 3. The mounting bracket 1 is used for securing a connecting plate (such as a vesa, not labeled), which secures a display 5. In particular, the mounting bracket 1 includes a main body 11, two first connecting members 12, two second connecting members 13, eight fastening members, and a support body 15. For the instant embodiment, any of the eight fastening member can be a first fastening member 14.

Figure 5:
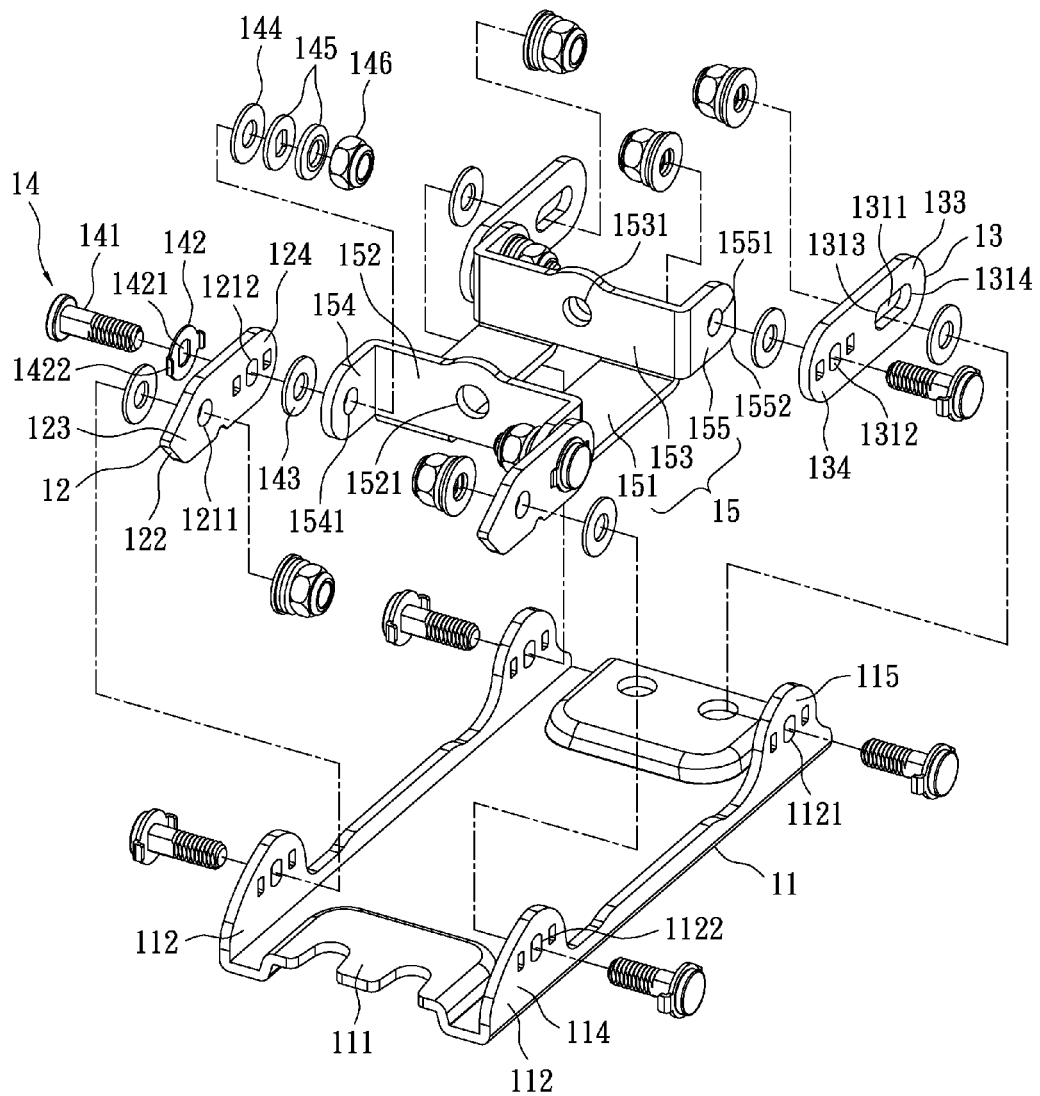
FIG. 5 is an exploded view of the mounting bracket of the adjustable display mounting bracket assembly of the first embodiment of the instant disclosure.
Figure 6:
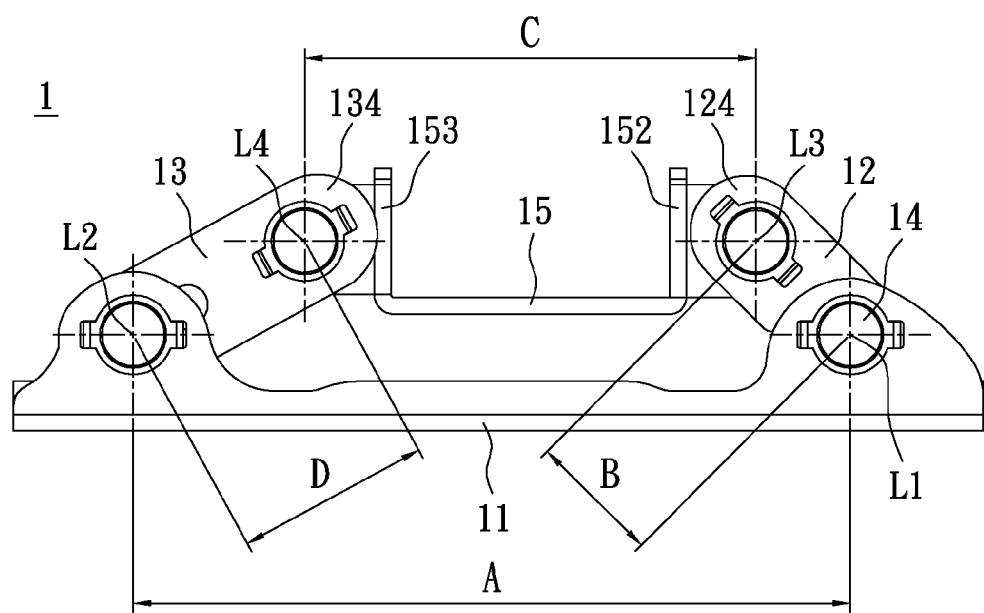
FIG. 6 is a side view of the mounting bracket of the first embodiment of the instant disclosure adjusted to its greatest extent.

Please now refer to FIGS. 5 and 6. The main body 11 has a flat base plate 111 and two opposing side plates 112 arranged perpendicularly on the base plate 111. A first fixing portion 114 and a second fixing portion 115 are formed on opposite ends of each side plate 112. A fixing hole 1122 is formed on each first fixing portion 114, and a through hole 1121 is formed on each second fixing portion 115.

Please refer to FIG. 4, wherein each first connecting member 12 has a flat first slab 121. Please refer back to FIGS. 5 and 6. The first slab 121 has a first end portion 123 and a second end portion 124 formed oppositely. A first hole 1211 is formed on the first end portion 123, and a second hole 1212 is formed on the second end portion 124. One first fastening member 14 is projected through the first hole 1211 and the corresponding fixing hole 1122, thus allowing the first connecting member 12 to be rotatable around a first axis $L_1$ and pivotal on the side plate 112 of the main body 11. In addition, a sloped blocking portion 122 is formed on the edge of the first end portion 123, with additional details given later.

As shown in FIG. 4, each second connecting member 13 has a flat second slab 131. Again, referring back to FIGS. 5 and 6, the second slab 131 has a first end portion 133 and a second end portion 134 formed oppositely. A sliding slot 1311 is formed on the first end portion 133, and an aligning hole 1312 is formed on the second end portion 134. Likewise, one first fastening member 14 is projected through the sliding slot 1311 and the through hole 1121, thus enabling the second connecting member 13 to be rotatable around a second axis $L_2$ and pivotal on the side plate 112 of the main body 11.

The sliding slot 1311 is ovally shaped with a first end 1313 and a second end 1314. For the instant embodiment, the sliding slot 1311 is extending substantially in the direction of the long axis of the second connecting member 13. The first end 1313 is formed in proximity to the aligning hole 1312, and the second end 1314 is formed away from the aligning hole 1312. The first fastening member 14 can slide between the first and second ends 1313 and 1314. In other words, each second connecting member 13 and corresponding first fastening member 14 can slide relative to each other in a direction perpendicularly to the second axis $L_2$. More details will be provided later.

The support body 15 has a flat base 151. A first supporting wall 152 and a second supporting wall 153 are perpendicularly arranged on the side portions of the base 151 opposingly. Two opposing first connecting portions 154 are perpendicularly arranged on the ends of the first supporting wall 152. Similarly, two opposing second connecting portions 155 are perpendicularly arranged on the ends of the second supporting wall 153. An inclined stopping portion 1552 is formed on the edge of each second connecting portion 155.

A first through hole 1541 is formed on each first connecting portion 154. One first fastening member 14 is used to project through the first through hole 1541 and the second hole 1212 of the corresponding first connecting member 12. Thereby, the support body 15 can rotate around a third axis $L_3$ and pivot relative to the first connecting members 12. Likewise, a second through hole 1551 is formed on each second connecting portion 155. Similarly, one first fastening member 14 is used to project through each second through hole 1551 and the aligning hole 1312 of the corresponding second connecting member 13. Thereby, the support body 15 can rotate about a fourth axis $L_4$ and pivot relative to the second connecting members 13.

A first shaft hole 1521 is further formed on the first supporting wall 152. Correspondingly, a second shaft hole 1531 is formed on the second supporting wall 153.

Next, please refer back to FIGS. 2 and 4. The linkage unit 2 comprises a shaft 4, a first connecting arm 22, a connecting shaft 21, and a second connecting arm 23. The respective ends of the shaft 4 are secured by the first and second shaft holes 1521 and 1531. The first connecting arm 22 is connected pivotally to the shaft 4 on one end and to the upper portion of the connecting shaft 21 on the opposite end. The second connecting arm 23 is connected pivotally to the fixing plate 3 on one end and to the lower portion of the connecting shaft 21 on the opposite end. Therefore, the display 5 has more degrees of freedom.

In this instant disclosure, the mounting bracket 1 operates between a maximum adjusting position and a collapsed position.

The maximum adjusting position of the mounting bracket 1 is illustrated in FIG. 6. It is shown that the first fastening member 14 is slid to the second end 1314 (referring to FIG. 5) of the sliding slot 1311 of the second connecting member 13. At such instant, a trapezoidal four-bar linkage of pivotally connected main body 11, the first connecting member 12, the second connecting member 13, and the support body 15 is constructed. In other words, the main body 11, the support body 15, the first connecting member 12 and the second connecting member 13 are the baseline, the top line, and the sides of the trapezoid, respectively. Among them, the main body 11 is the longest. However, the construction is not restricted to the above.

More specifically, at the maximum adjusting position, the distance between the first axis $L_1$ and the second axis $L_2$ is denoted as A, the distance between the first axis $L_1$ and the third axis $L_3$ is denoted as B, the distance between the third axis $L_3$ and the fourth axis $L_4$ is C, and the distance between the second axis $L_2$ and the fourth axis $L_4$ is D. Obviously, at the maximum adjusting position, the sum of B, C, and D is greater than A (A<B+C+D). In other words, the four-bar linkage structure is a double rocker mechanism, wherein the first and second connecting members 12 and 13 are rockers, and the support body 15 acts as the fixed link. This mechanism allows angular adjustments between the support body 15 and the main body 11. Additional details will be given hereinafter.

Figure 16:
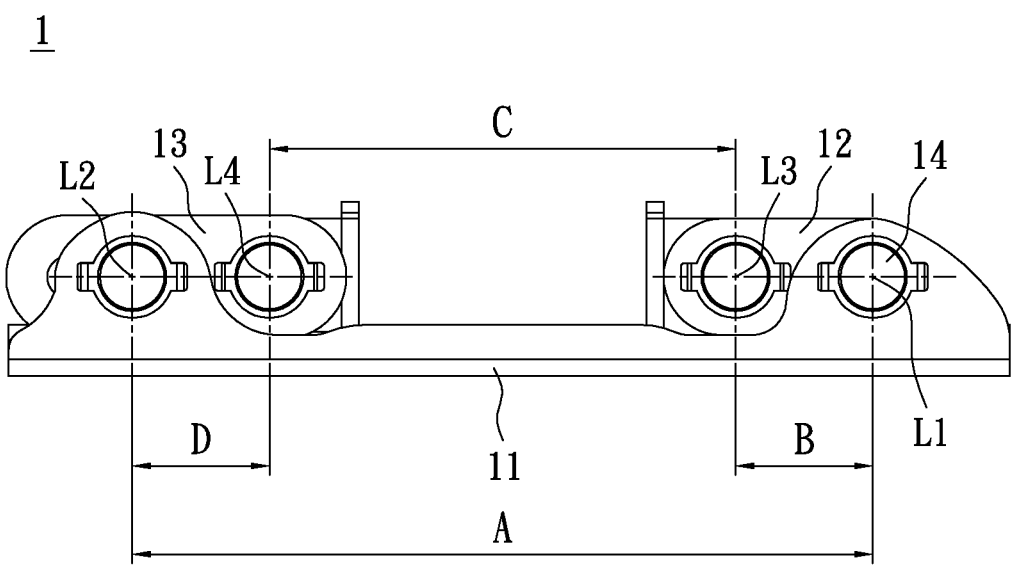
FIG. 16 is a side view of the mounting bracket of the first embodiment of the instant disclosure in collapsed configuration.

At the collapsed position, as shown in FIG. 16, the first fastening member 14 is slid to the first end 1313 (FIG. 5) of the sliding slot 1311 of the second connecting member 13. At this moment, the distance D between the second axis L2 and the fourth axis L4 is shortest, while the distances A, B, and C remain the same. As shown in FIG. 16, the sum of B, C, and D equals A (A=B+C+D). Structurally, the base 151 of the support body 15 parallelly fits the base plate 111 of the main body 11. At this collapsed position, as also illustrate in FIG. 4, no angular adjustment is allowable between the support body 15 and the main body 11.

As a side note, if the first fastening member 14 is not at either the first end 1313 or the second end 1314, but rather at the middle of the sliding slot 1311, external forces can still be applied to make angular adjustments between the base 151 and the base plate 111. However, the degree of the adjustment is relatively smaller.

Figure 9:
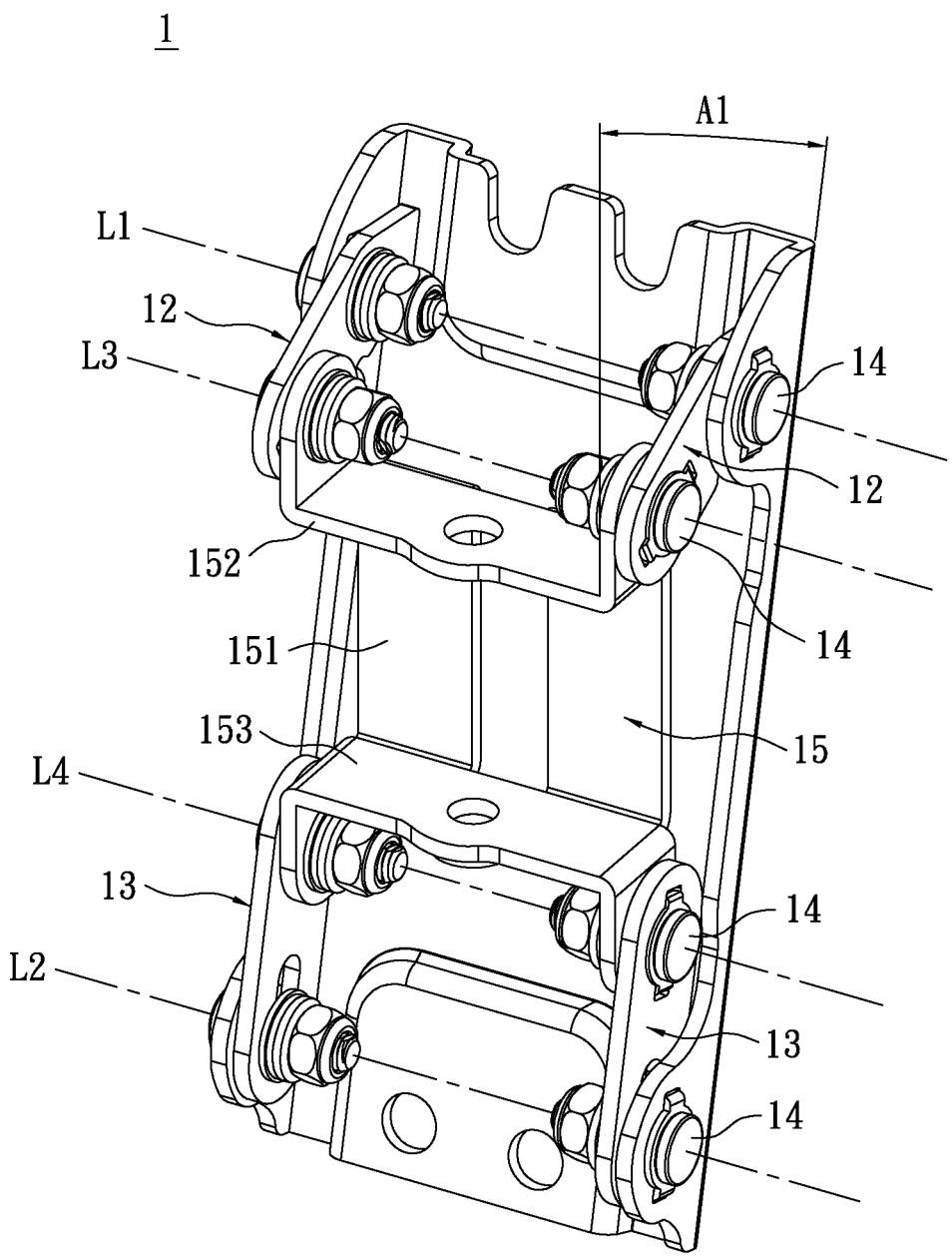
FIG. 9 is a perspective view of the mounting bracket of the first embodiment of the instant disclosure at greatest downward inclination in use.
Figure 10:
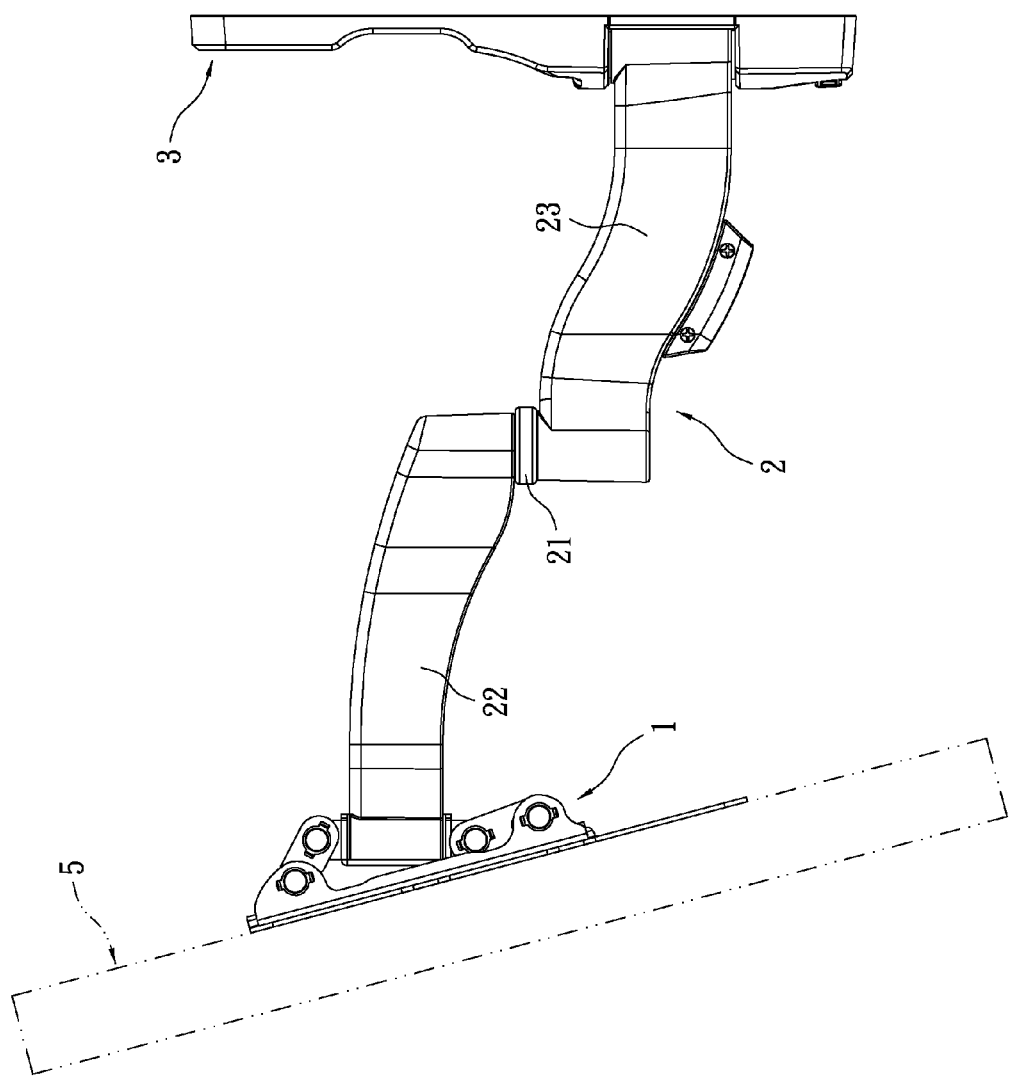
FIG. 10 is a side view of the adjustable mounting bracket assembly at greatest downward inclination connected to the display in use.

Please refer back to FIG. 6, wherein angular adjustments for the maximum adjusting position are explained herein. If an upward force is applied to the first supporting wall 152 of the support body 15, and if a downward force is applied to the second supporting wall 153, the second connecting members 13 of the double rocker mechanism would pivot downward and the second end portions 134 would approach the base plate 111 of the main body 11. Ultimately, as shown in FIG. 9, an angle A1 is thus formed between the base 151 of the support body 15 and the base plate 111 of the main body 11. More precisely, angle A1 is the largest downward inclination angle of the mounting bracket 1. In other words, as shown in FIG. 10, the display 5 can be inclined downward relative to the linkage unit 2.

Figure 11:
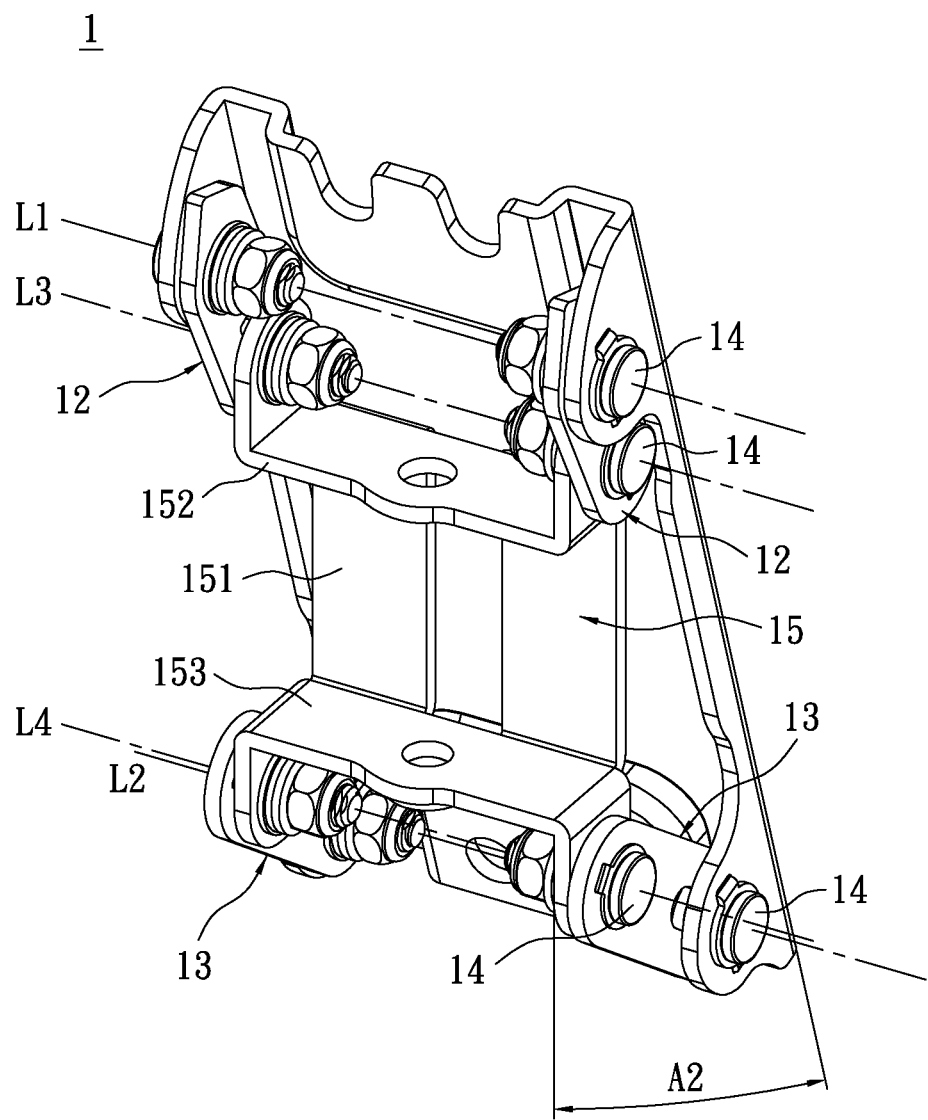
FIG. 11 is a perspective view of the mounting bracket of the first embodiment of the instant disclosure at greatest upward inclination in use.
Figure 12:
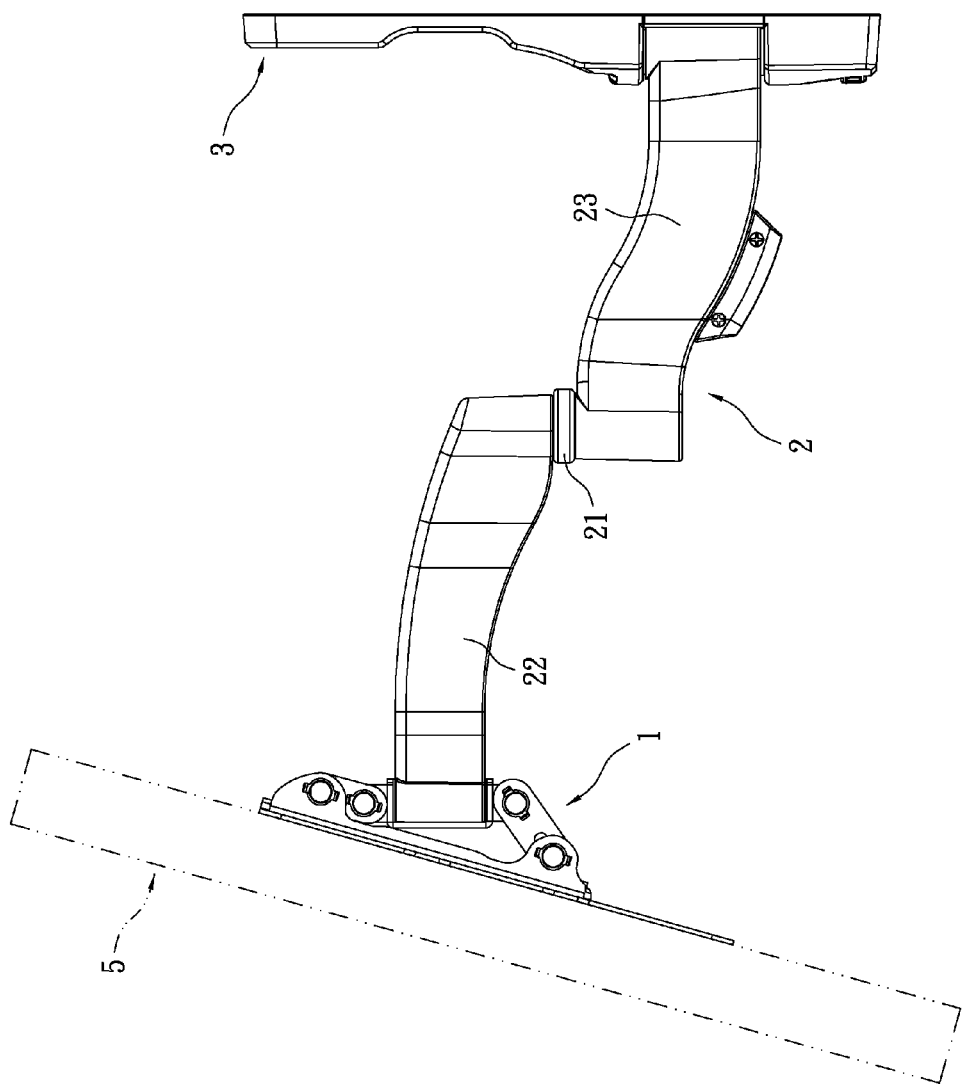
FIG. 12 is a side view of the adjustable mounting bracket assembly at greatest upward inclination connected to the display in use.

Conversely, if a downward force is applied to the first supporting wall 152, and if an upward force is applied to the second supporting wall 153, the first connecting members 12 of the double rocker mechanism would pivot downward and the second end portions 124 would approach the base plate 111 of the main body 11. Ultimately, as shown in FIG. 11, an angle A2 is formed between the base 151 and the base plate 111. Relatively, A2 is the largest upward inclination angle of the mounting bracket 1. In other words, as shown in FIG. 12, the display 5 can be inclined upward relative to the linkage unit 2.

To adjust the mounting bracket 1 from the maximum adjusting position to the collapsed position, please start with FIG. 6 again. A downward & leftward force is applied to the second supporting wall 153 of the support body 15. The applied force causes the second connecting members 13 to slide with respect to the first fastening members 14. In addition, the second end portion 124 is driven to pivot downward. Thus, the base 151 of the support body 15 approaches the base plate 111 of the main body 11. When the first fastening members 14 have slid to the first ends 1313 of the sliding slots 1311, the base 151 of the support body 15 would parallelly fit the base plate 111 of the main body 11. In this manner, the occupied space at the collapsed position is minimized.

Figure 13:
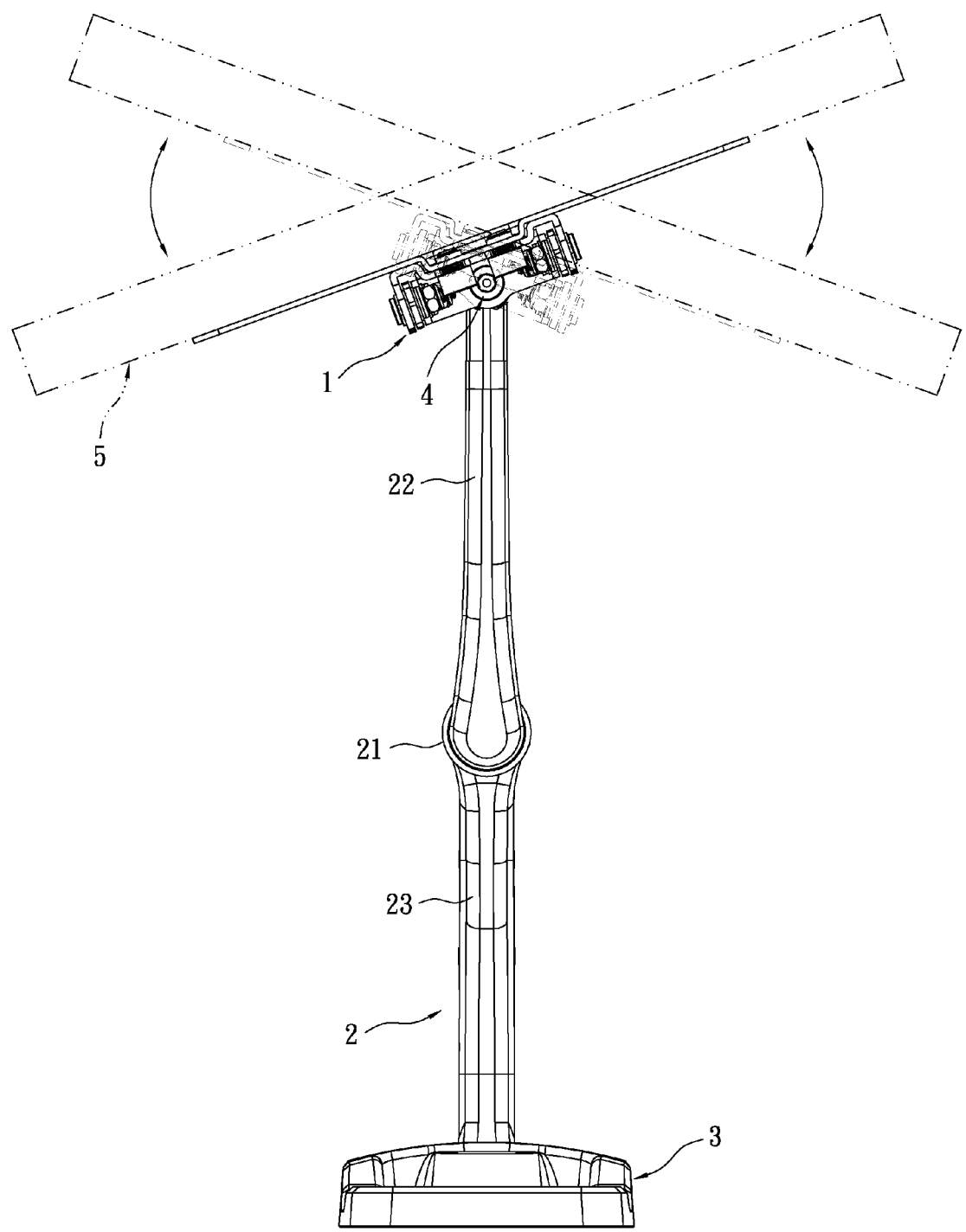
FIG. 13 is a top view of the adjustable display mounting bracket assembly of the first embodiment of the instant disclosure connected to the display in another use.
Figure 14:
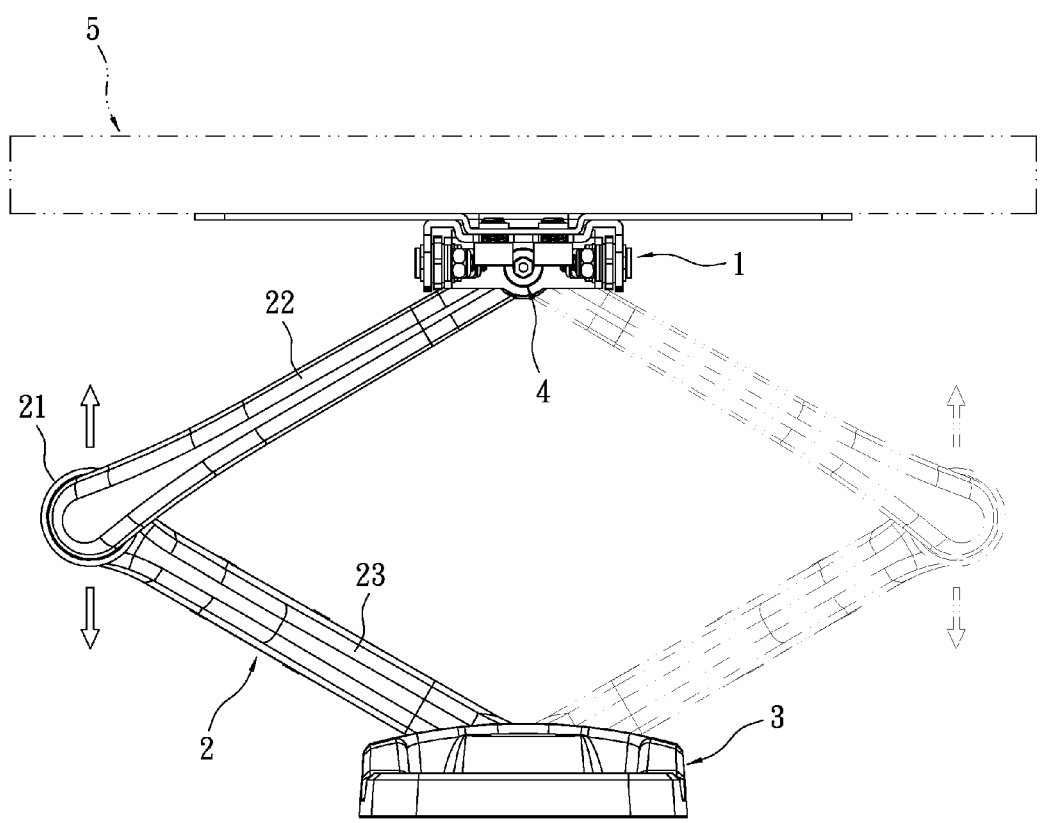
FIG. 14 is a top view of the adjustable display mounting bracket assembly of the first embodiment of the instant disclosure connected to the display in yet another use.
Figure 15:
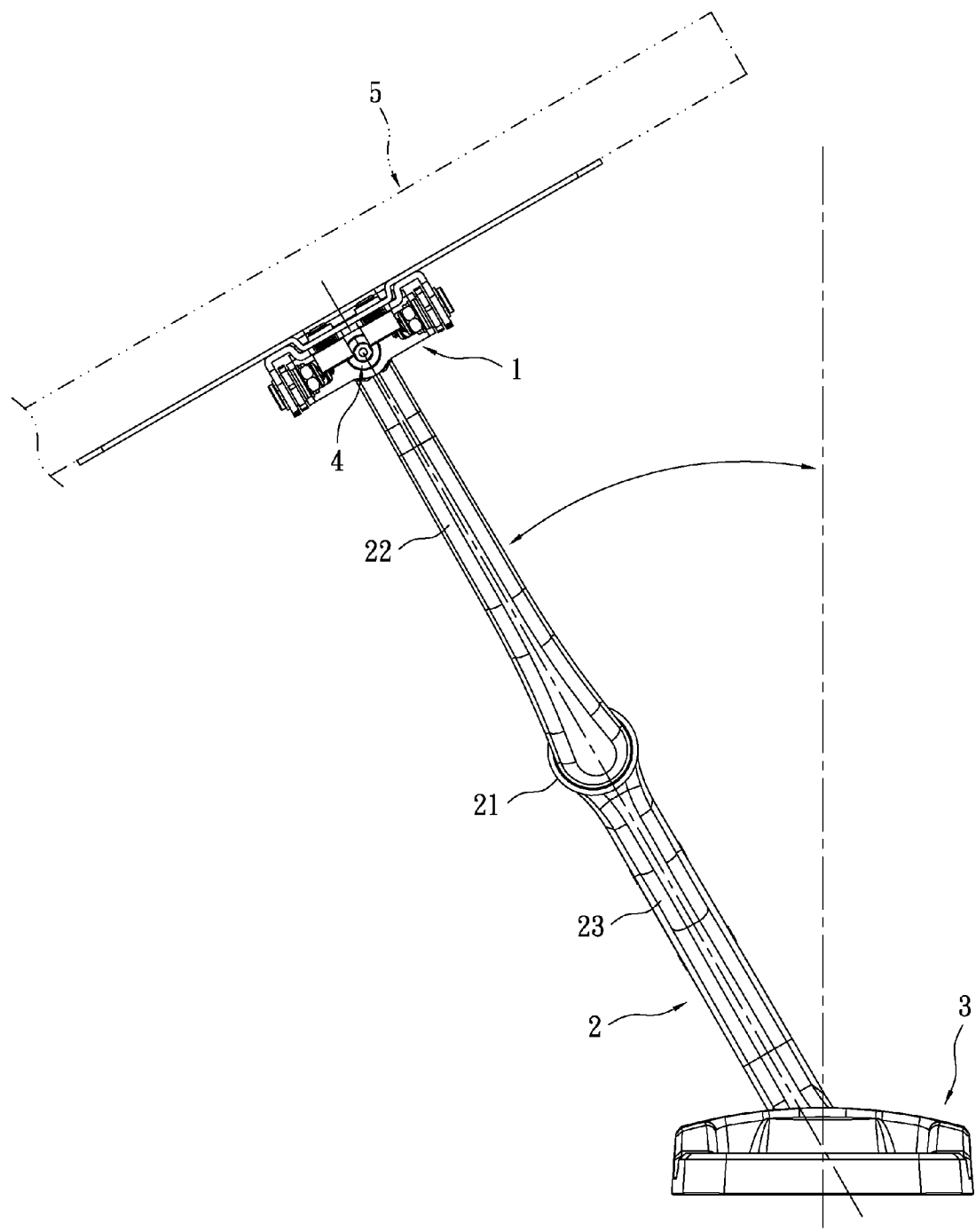
FIG. 15 is a top view of the adjustable display mounting bracket assembly of the first embodiment of the instant disclosure connected to the display in still yet another use.

After explaining how the vertical adjustment is achieved, it goes to the horizontal adjustment. If the joint between the linkage unit 2 and the shaft 4 is chosen as the pivot point, the mounting bracket 1 (or display 5) can pivot clockwise or counter-clockwise with respect to the linkage unit 2 (as shown by the arrows in FIG. 13). Alternatively, if the connecting shaft 21 of the linkage unit 2 is chosen as the pivot point, the mounting bracket 1 (or display 5) can move away or toward the fixing plate 3 (as shown by the arrows in FIG. 14). In addition, if the joint between the second connecting arm 23 and the fixing plate 3 is selected as the pivot point, the mounting bracket 1 (or display 5) can diagonally shift with respect to the fixing plate 3 as shown in FIG. 15. In other words, there is almost no dead angle when adjusting.

Also, since the first and second connecting arms 22 and 23 have approximately equal lengths, when both are pivoted toward the fixing plate 3, the mounting bracket 1 is pulled very close to the fixing plate 3, with a very short distance separating the two. In fact, they can touch each other. In addition, since the mounting bracket 1 can be completely collapsed, with the base 151 parallelly fitting the base plate 111, the display 5, if not in use, can be maneuvered such that the occupied space is effectively reduced.

Please refer back to FIGS. 5 and 9. When the angle A1 (largest downward inclination angle) is formed by the base 151 of the support body 15 and the base plate 111 of the main body 11, the blocking portion 122 of each first connecting member 12 and the stopping portions 1552 of the support body 15 abut to the base plate 111 simultaneously. Such setup provides added support strength-wise and fixing the mounting bracket 1 at a particular orientation.

Next, detailed descriptions for the first fastening members 14 are given herein. Please refer to FIG. 5. Each fastening member 14 has a threaded body 141, a locking piece 142, a first lock washer 143, a second lock washer 144, two torque-adjusting washers 145, and a nut 146. Two engaging openings (not labeled) are formed on respective sides of the second hole 1212 of each first connecting member 12 oppositely. A locking hole 1421 is formed centrally on the locking piece 142. Two protrusions 1422 are formed on respective sides of the locking piece 142 oppositely. The protrusions 1422 are used for engaging to the respective engaging openings of the corresponding first connecting member 12. The first lock washer 143 and the second lock washer 144 are disposed on respective sides of the first through hole 1541 of the corresponding first connecting portion 154 oppositely. In particular, the first and second lock washers 143 and 144 are aligned with the second hole 1212 of the first connecting member 12. In sequence, the threaded body 141 projects through the locking hole 1421 of the locking piece 142, the second hole 1212 of the first connecting member 12, the first lock washer 143, the first through hole 1541 of the first connecting portion 154, the second lock washer 144, two torque-adjusting washers 145, and the nut 146.

Depending on the display 5, the threaded body 141 of each first fastening member 14 can be tightened or loosened based on needs. Thereby, the torque distribution between the first connecting members 12 and the support body 15 can be adjusted. Thus, damages due to wear and tear can be reduced. In addition, depending on the geometry of the threaded body 141, such as an oval-shaped body, the locking hole 1421 of the locking piece 142, the second hole 1212 of the first connecting member 12, the first and second lock washers 143 and 144, and the two torque-adjusting washers 145 can be chosen accordingly to fit with the threaded body 141.

Based on needs, the number and shape of the torque-adjusting washers and lock washers can be varied without restriction.

As a side note, please refer back to FIG. 2. In use, the outer surface of the base plate 111 of the mounting bracket 1 away from the linkage unit 2 is secured to a connecting plate (not labeled). The display 5 is bolted to the connecting plate, which is selected based on the size of the display 5.

Second Embodiment

Figure 7:
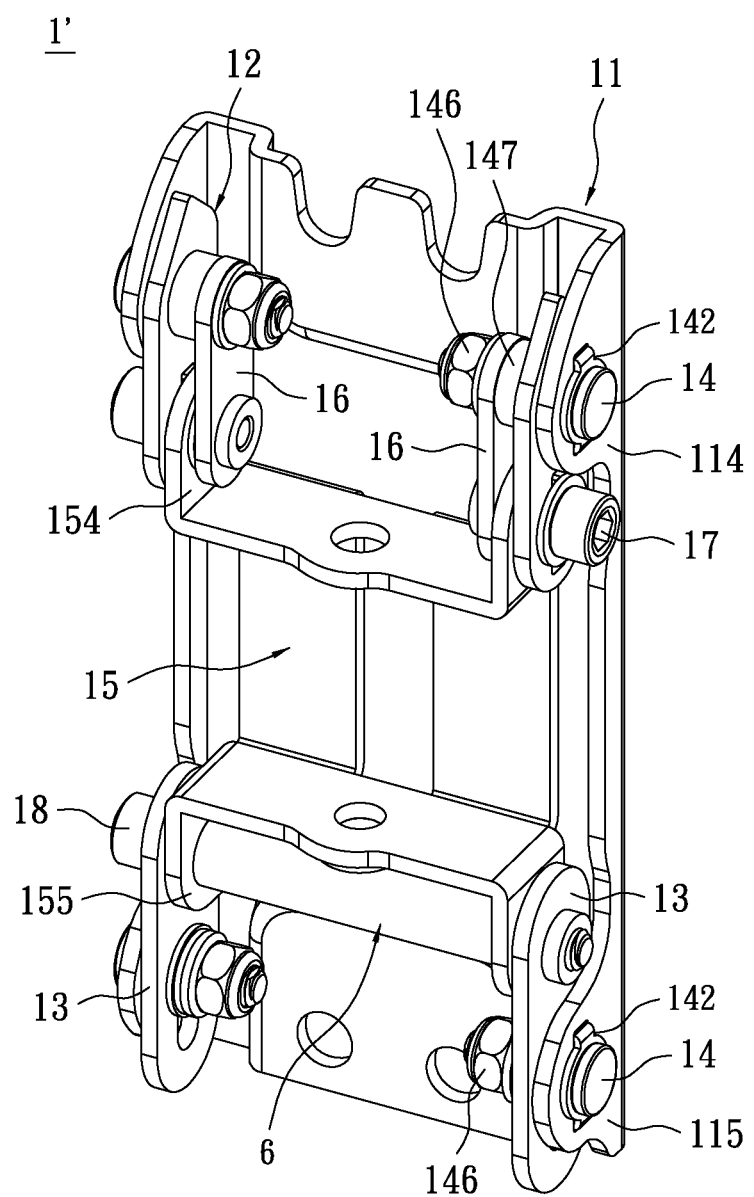
FIG. 7 is a perspective view of a mounting bracket of the adjustable display mounting bracket assembly of a second embodiment of the instant disclosure.
Figure 8:
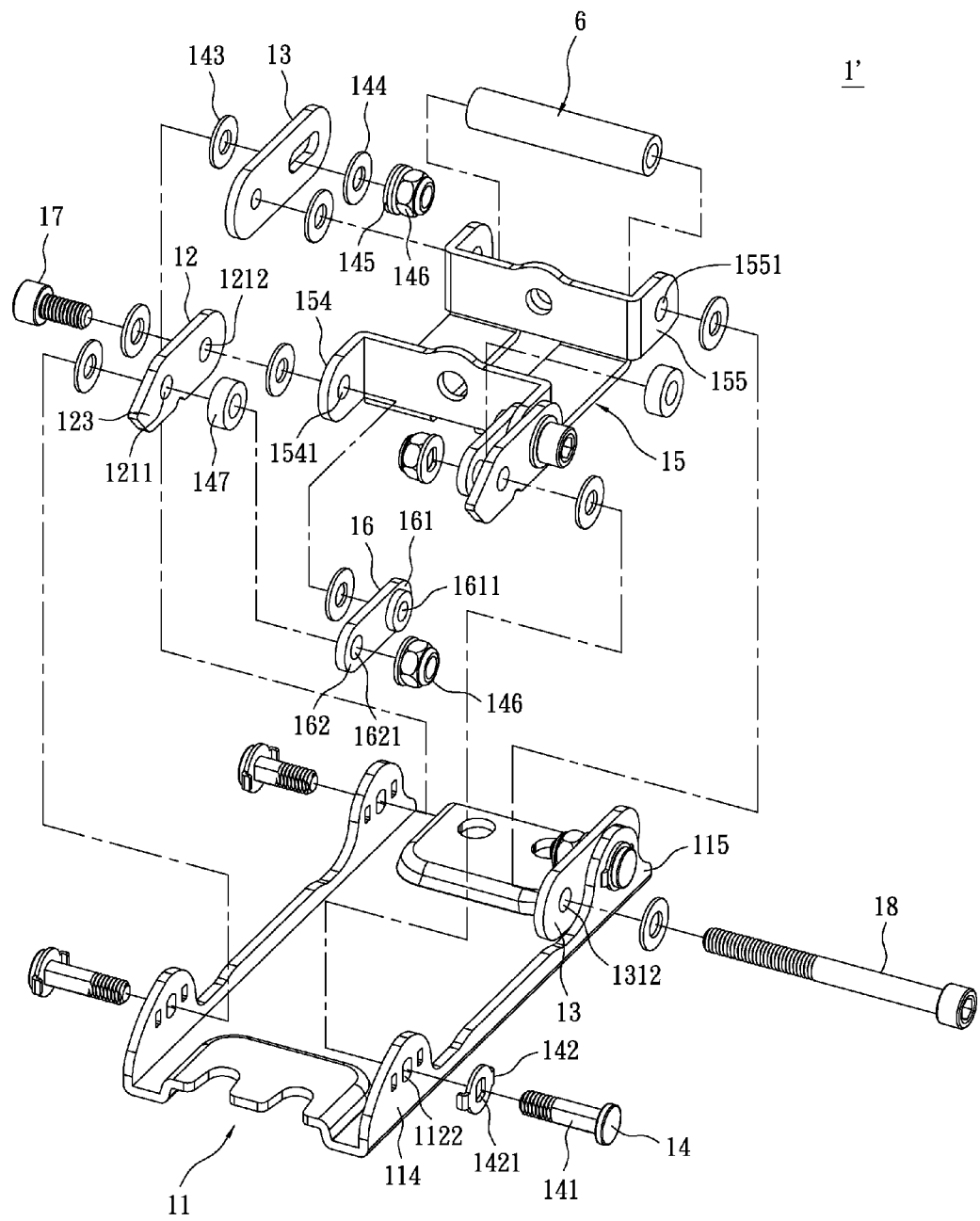
FIG. 8 is an exploded view of the mounting bracket of the adjustable display mounting bracket assembly of the second embodiment of the instant disclosure.

The instant disclosure provides another embodiment. Comparing to the first embodiment, the fastening means of the instant embodiment can further include at least one second fastening member 17 and at least one third fastening member 18, which are illustrated in FIGS. 7 and 8. Additional details are given below.

Furthermore, for the instant embodiment, the mounting bracket 1' further includes a pair of support links 16. The purpose is to bolster the tightness of the corresponding fastening members, such that the fastening members do not come loose while the mounting bracket 1' is being adjusted Each support link 16 has a first end portion 161 having a first securing hole 1611 formed thereon. The second fastening member 17 is a socket head cap screw, which is driven through the second hole 1212 of the first connecting member 12, the first through hole 1541 of the first connecting portion 154 of the support body 15, and the first securing hole 1611 of the support link 16.

Yet still, the instant embodiment further includes a pair of spacers 147. A second end portion 162 is defined on each support link 16 opposite of the first end portion 161. A second securing hole 1621 is formed on the second end portion 162. Each spacer 147 is disposed between the corresponding first end portion 123 of the first connecting member 12 and the second end portion 162 of the support link 16. The tubular-shaped spacers 147 are aligned with the first holes 1211 of the first connecting members 12 and the second securing holes 1621 of the support links 16. Specifically, one first fastening member 14 is projected through the corresponding first fixing portion 114, the first end portion 123 of the first connecting member 12, the spacer 147, and the second end portion 162 of the support link 16 in sequence.

Also, the instant embodiment includes a sleeve 6. The third fastening member 18 is a screw, which is driven through the aligning holes 1312 of the second connecting members 13 and the second through holes 1551 of the second connecting portions 155 of the support body 15. The sleeve 6 is fitted over the third fastening member 18 between the second connecting portions 155. The opposite ends of the sleeve 6 face toward the respective inner surfaces of the second connecting members 13 adjacent to the second connecting portions 155. In comparing to the second fastening member 17, the third fastening member 18 can be a longer socket head cap screw. By replacing the first fastening members 14 in the first embodiment with a single socket head cap screw, fewer fasteners are used. Plus, the user would be required to adjust fewer fasteners to save time and effort.

As a side note, the use of the first fastening members 14, the second fastening members 17, and the third fastening member 18 for the mounting bracket 1' only shows a preferable fastening means for the instant embodiment. In practice, the actual fastening means for the mounting bracket can be varied based on needs. For example, the mounting bracket can use the first fastening members 14 only as in the first embodiment, or any combination of the first fastening member 14, the second fastening member 17, and the third fastening member 18.

In addition, the locations of the support links 16 are not restricted. Namely, the support links 16 can be selectively disposed according to the selected fastening means with respect to the first, second, and third fastening members. The number, type, and the location of the abovementioned fasteners and support links 16 are not restricted.

Third Embodiment

Figure 17:
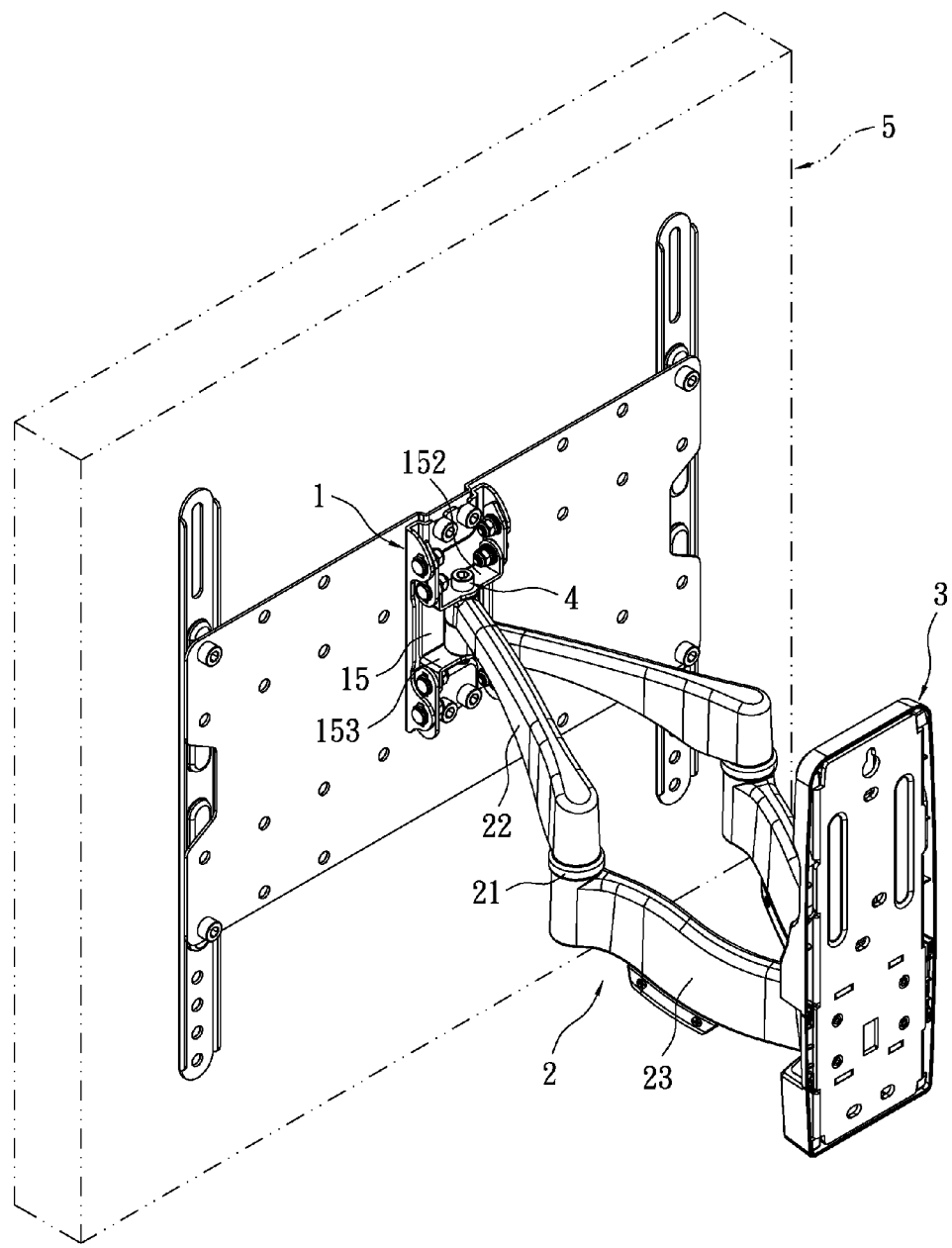
FIG. 17 is a perspective view of an adjustable display mounting bracket assembly of a third embodiment of the instant disclosure connected to a display.
Figure 18:
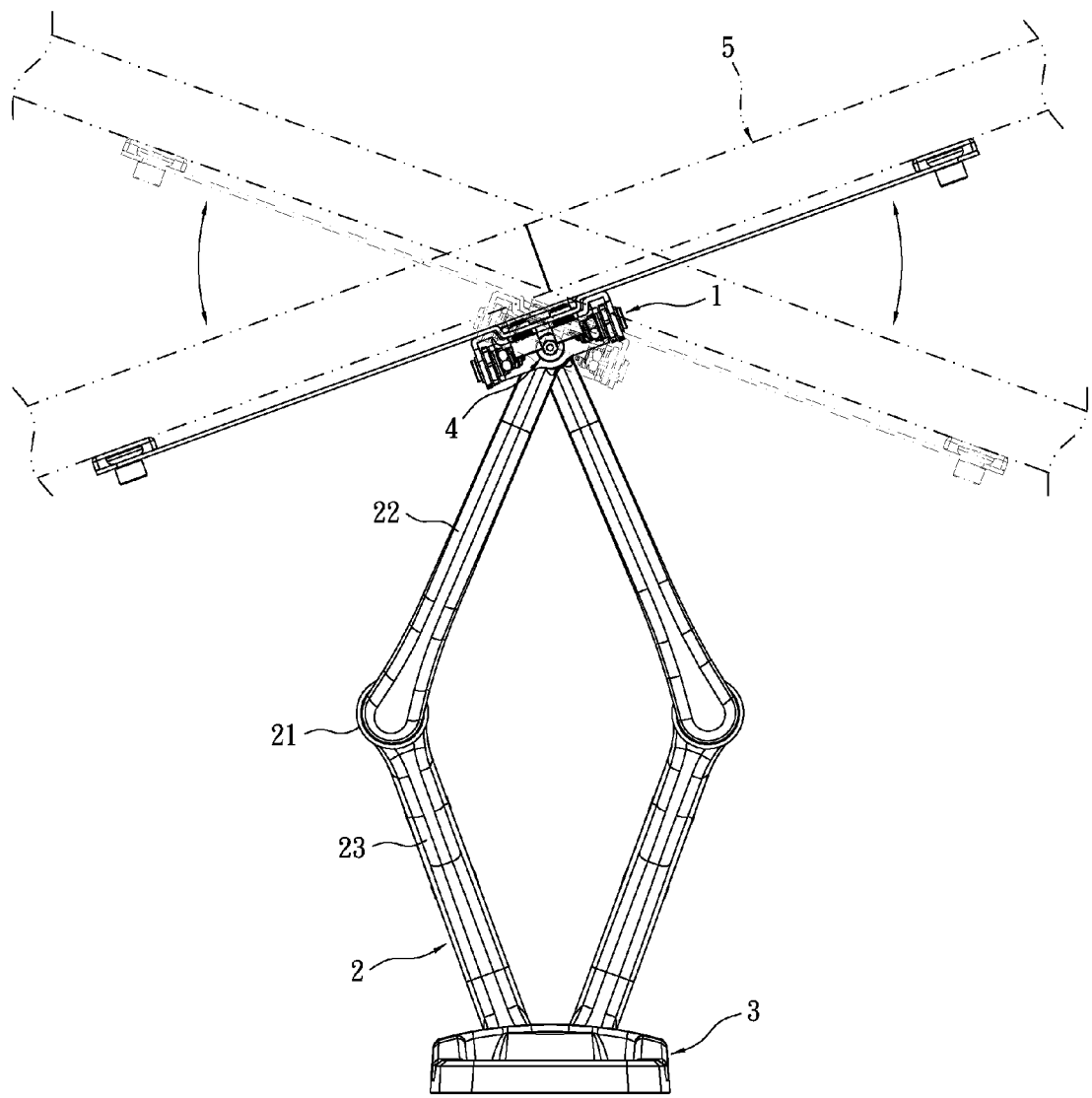
FIG. 18 is a perspective view of the adjustable display mounting bracket assembly of the third embodiment of the instant disclosure connected to the display in use.
Figure 19:
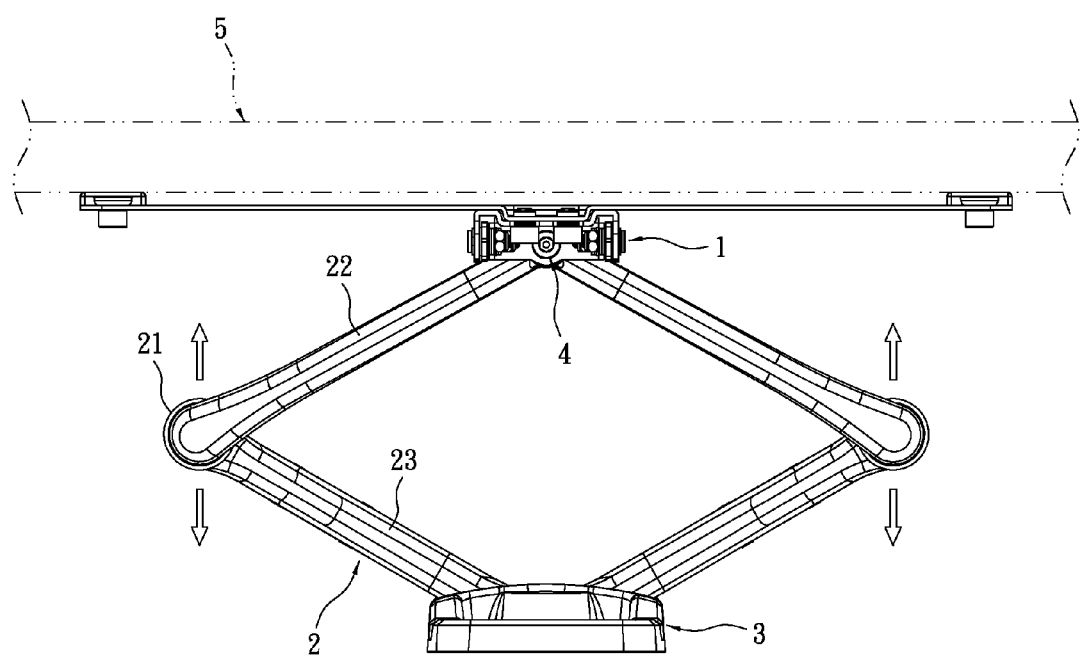
FIG. 19 is a perspective view of the adjustable display mounting bracket assembly of the third embodiment of the instant disclosure connected to the display in another use.

Please refer to FIG. 17, which shows a third embodiment of the instant disclosure. The third embodiment is similar to the previous embodiments. However, for the third embodiment, the linkage unit 2 has two first connecting arms 22, two connecting shafts 21, and two second connecting arms 23. Like those in the first embodiment, each first connecting arm 22, connecting shaft 21, and second connecting arm 23 constitute one linkage set. Namely, there are one left linkage set and one right linkage set respectively. The connecting means with the mounting bracket 1 and the fixing plate 3 is the same as the previous embodiments, therefore is not repeated herein. Functionally, as shown in FIGS. 18 and 19, the linkage unit 2 of the third embodiment is also the same as the previous embodiments. However, by increasing the number of the first and second connecting arms 22 and 23, the mounting bracket assembly has greater support strength and is able to hold heavier displays.

Based on the above, by virtue of the mounting bracket assembly of the instant disclosure, the display can be mounted to the adjustable mounting bracket, wherein the linkage unit is pivotally connected to the mounting bracket and the fixing plate on opposite ends. When the connecting shaft of the linkage unit is chosen as the pivot point, the display can shift toward or away from the fixing plate, or moving diagonally with respect to the fixing plate. On the other hand, if the shaft of the linkage unit is chosen as the pivot point, the display can pivot on the linkage unit accordingly. When the mounting bracket is adjusted to the greatest extent, i.e., at the trapezoidal position, the display can be inclined upward or downward with respect to the linkage unit. Thereby, the adjustable mounting bracket assembly of the instant disclosure allows adjustments of the viewing angle of the display and its position. When not in use, the mounting bracket can be collapsed and the assembly itself can be pivoted so as to reduce the occupied space.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims

What is claimed is:

1. An adjustable display mounting bracket assembly for securing to a mounting surface, comprising:
 a mounting bracket, comprising:
  a main body having at least one first fixing portion and at least one second fixing portion;
  at least one first connecting member having a first end portion and an opposite second end portion, the first end portion of the first connecting member being pivotally connected to the first fixing portion of the main body and rotatable about a first axis;
  at least one second connecting member having a first end portion and an opposite second end portion, the first end portion of the second connecting member having an elongated sliding slot formed thereon extending substantially in the direction of the long axis of the second connecting member, the sliding slot having a first end defined in proximity of the second end portion of the second connecting member and an opposite second end;
  at least one fastening means disposed through the sliding slot for pivotally connecting the first end portion of the second connecting member to the second fixing portion of the main body and enabling the second connecting member to be rotatable about a second axis, and
  a support body having at least one first connecting portion and at least one second connecting portion, the first connecting portion being pivotally connected to the second end portion of the first connecting member and rotatable about a third axis, the second connecting portion being pivotally connected to the second end portion of the second connecting member and rotatable about a fourth axis;
 a fixing plate for securing to the mounting surface; and
 at least one linkage unit pivotally connecting the fixing plate on one end and pivotally connecting the mounting bracket on the other end, the relative positions between the mounting bracket and the fixing plate being adjustable by the linkage unit;
wherein the first end portion of the second connecting member is slidable with respect to the second fixing portion for altering the relative distance between the second axis and the fourth axis, wherein the distance between the second axis and the fourth axis becomes shortest when the fastening means moves to the first end of the sliding slot, wherein the distance between the second axis and the fourth axis becomes longest when the fastening means moves to the second end of the sliding slot.

2. The adjustable display mounting bracket assembly of claim 1, wherein the support body has a base, a first supporting wall, and a second supporting wall, the first supporting wall and the second supporting wall being arranged perpendicularly on opposite edges of the base, at least one first shaft hole being formed on the first supporting wall, at least one second shaft hole being formed correspondingly on the second supporting wall, wherein the linkage unit further comprises a shaft, a first connecting arm, a connecting shaft, and a second connecting arm, the opposite ends of the shaft being projected through the first shaft hole and the second shaft hole respectively, the first connecting arm being pivotally connected to the shaft on one end and pivotally connected to the connecting shaft on opposite end, the second connecting arm being pivotally connected to the connecting shaft on one end and pivotally connected to the fixing plate on opposite end.

3. The adjustable display mounting bracket assembly of claim 1, wherein the distance between the first axis and the second axis is defined as A, the distance between the first axis and the third axis being defined as B, the distance between the third axis and the fourth axis being defined as C, the distance between the second axis and the fourth axis being defined as D, wherein A is equal to the sum of B, C, and D when the fastening means is slid to the first end of the sliding slot.

4. The adjustable display mounting bracket assembly of claim 3, wherein A is less than the summation of B, C, and D when the fastening means is not at the first end of the sliding slot, wherein a double rocker mechanism being formed by the main body, the first connecting member, the second connecting member, and the support body, the first connecting member and the second connecting member each being a rocker for the double rocker mechanism, the support body being a fixed link.

5. The adjustable display mounting bracket assembly of claim 4, wherein the main body has a base plate and at least one side plate formed perpendicularly on the edges thereof, the first fixing portion and the second fixing portion being formed on respective ends of the side plate oppositely, wherein the support body has a base, a first supporting wall and a second supporting wall being arranged perpendicularly on respective edges thereof oppositely, a first connecting portion being arranged perpendicularly on each of the two opposite edges of the first supporting wall, a second connecting portion being arranged perpendicularly on each of the two opposite edges of the second supporting wall, the distance between the second axis and the fourth axis being the longest while the fastening means being at the second end of the sliding slot for maximum angular adjustment between the base plate of the main body and the base of the support body.

6. The adjustable display mounting bracket assembly of claim 5, wherein the distance between the second axis and the fourth axis is the shortest while the fastening means being at the first end of the sliding slot with the base plate of the main body parallelly fitting the base of the support body.

7. The adjustable display mounting bracket assembly of claim 6, wherein a fixing hole is formed on the first fixing portion and a through hole is formed on the second fixing portion, a first through hole being formed on the first connecting portion and a second through hole being formed on the second connecting portion, a first hole being formed on the first end portion of the first connecting member and a second hole being formed on the second end portion of the first connecting member, an aligning hole being formed on the second end portion of the second connecting member, the fastening means being projected through the first through hole, the second hole, the second through hole, the aligning hole, the fixing hole, the first hole, the through hole, and the sliding slot to pivotally connecting the main body, the first connecting member, the second connecting member, and the support body.

8. The adjustable display mounting bracket assembly of claim 7, wherein a blocking portion is formed on the first end portion of the first connecting member, and wherein a stopping portion is formed on the second connecting portion of the support body.

9. The adjustable display mounting bracket assembly of claim 7, wherein the fastening means includes at least one first fastening member, wherein the first fastening member has at least one locking piece, at least one first lock washer, at least one second lock washer, at least one torque-adjusting washer, and a nut, and wherein the first fastening member is driven inwardly through a locking hole of the locking piece, the first lock washer, the second lock washer, the torque-adjusting washers, and the nut.

10. The adjustable display mounting bracket assembly of claim 9, further comprising at least one support link, wherein the fastening means further includes at least one second fastening member, the support link having a first end portion with a first securing hole formed on the first end portion, and wherein the second fastening member has a threaded body driven through the second hole of the first connecting member, the first through hole of the first connecting portion of the support body, and the first securing hole of the support link.

11. The adjustable display mounting bracket assembly of claim 10, further comprising at least one spacer, wherein a second end portion is defined on the support link opposite of the first end portion, a second securing hole being formed on the second end portion of the support link, the spacer being disposed between the first end portion of the first connecting member and the second end portion of the support link, the spacer being aligned with the first hole of the first connecting member and the second securing hole of the support link, the first fastening member being projected through the first fixing portion of the main body, the first end portion of the first connecting member, the spacer, and the second end portion of the support link.

12. The adjustable display mounting bracket assembly of claim 7, further comprising at least one sleeve, wherein the fastening means further includes at least one third fastening member having a threaded body, the third fastening member being driven through the second through holes of the opposing second connecting portions and the aligning holes of the second connecting members, the sleeve being fitted over the third fastening member between the opposing second connecting portions, and wherein the opposite ends of the sleeve face toward the respective inner surfaces of the second connecting members adjacent to the second connecting portions.

* * * * *